US010972558B2

(12) United States Patent
Yishay et al.

(10) Patent No.: US 10,972,558 B2
(45) Date of Patent: Apr. 6, 2021

(54) SYSTEM AND METHOD FOR TRACKING USERS OF COMPUTER APPLICATIONS

(71) Applicant: Verint Systems LTD., Herzliya Pituach (IL)

(72) Inventors: Yitshak Yishay, Revava (IL); Liran Orevi, Rishon Lezion (IL); Itsik Horovitz, Holon (IL); Aviad Rotem, Petah-Tikva (IL)

(73) Assignee: VERINT SYSTEMS LTD., Pituach (IL)

( * ) Notice: Subject to any disclaimer, the term of this patent is extended or adjusted under 35 U.S.C. 154(b) by 86 days.

(21) Appl. No.: 15/966,010

(22) Filed: Apr. 30, 2018

(65) Prior Publication Data
US 2018/0332127 A1 Nov. 15, 2018

(30) Foreign Application Priority Data
Apr. 30, 2017 (IL) .......................... 252041

(51) Int. Cl.
*G06F 15/173* (2006.01)
*H04L 29/08* (2006.01)
*H04L 12/58* (2006.01)

(52) U.S. Cl.
CPC .............. *H04L 67/22* (2013.01); *H04L 51/34* (2013.01); *H04L 67/24* (2013.01); *H04L 67/306* (2013.01)

(58) Field of Classification Search
CPC ......... H04L 51/34; H04L 67/22; H04L 67/24; H04L 67/306

(Continued)

(56) References Cited

U.S. PATENT DOCUMENTS 5,689,442 A 11/1997 Swanson et al.
6,404,857 B1 6/2002 Blair et al.
(Continued)

FOREIGN PATENT DOCUMENTS

WO 2012/075347 6/2012

OTHER PUBLICATIONS

Aho, Alfred V., et al., "Efficient String Matching: An Aid to Bibliographic Search," Communication of the ACM, Jun. 1975, vol. 18, No. 6, pp. 333-340.
(Continued)

*Primary Examiner* — Liang Che A Wang
(74) *Attorney, Agent, or Firm* — Meunier Carlin & Curfman LLC

(57) ABSTRACT

A monitoring system that receives messages that are exchanged with the application server. Relationships between users are posited in response to the times at which the messages are received. A relationship between two users may be posited in response to receiving, at approximately the same time, two messages from the application server that are destined, respectively, for the two users. The near-simultaneous receipt of the two messages indicates that the two messages were sent from the server at approximately the same time, which, in turn, indicates that the two messages may correlate with one another. Further indication of a correlation between the messages, which may increase the level of confidence with which the relationship between the two users is posited, may be found by examining the respective sizes of the messages, which indicate the message types.

19 Claims, 3 Drawing Sheets

(58) Field of Classification Search
USPC .................................. 709/223, 224, 225, 226
See application file for complete search history.

(56) References Cited

U.S. PATENT DOCUMENTS

| | | | |
|---|---|---|---|
| 6,718,023 | B1 | 4/2004 | Zolotov |
| 6,741,992 | B1 | 5/2004 | McFadden |
| 6,757,361 | B2 | 6/2004 | Blair et al. |
| 7,134,141 | B2 | 11/2006 | Crosbie |
| 7,145,898 | B1* | 12/2006 | Elliott ..................... H04L 12/66 370/352 |
| 7,216,162 | B2 | 5/2007 | Amit et al. |
| 7,225,343 | B1 | 5/2007 | Honig et al. |
| 7,269,157 | B2 | 9/2007 | Klinker et al. |
| 7,287,278 | B2 | 10/2007 | Liang |
| 7,466,816 | B2 | 12/2008 | Blair |
| RE40,634 | E | 2/2009 | Blair et al. |
| 7,587,041 | B2 | 9/2009 | Blair |
| 7,769,875 | B1 | 8/2010 | Moisand et al. |
| 7,882,217 | B2 | 2/2011 | Katzir |
| 8,037,167 | B1 | 10/2011 | Bellovin |
| RE43,103 | E | 1/2012 | Rozman et al. |
| 8,176,527 | B1 | 5/2012 | Njemanze et al. |
| 8,201,245 | B2 | 6/2012 | Dewey et al. |
| RE43,528 | E | 7/2012 | Rozman et al. |
| RE43,529 | E | 7/2012 | Rozman et al. |
| 8,224,761 | B1 | 7/2012 | Rockwood |
| RE43,987 | E | 2/2013 | Rozman et al. |
| 8,402,543 | B1 | 3/2013 | Ranjan et al. |
| 8,413,244 | B1 | 4/2013 | Nachenberg |
| 8,499,348 | B1 | 7/2013 | Rubin |
| 8,578,493 | B1 | 11/2013 | McFadden |
| 8,665,728 | B2 | 3/2014 | Altman |
| 8,682,812 | B1 | 3/2014 | Ranjan |
| 8,762,948 | B1 | 6/2014 | Zaitsev |
| 8,838,951 | B1 | 9/2014 | Hicks et al. |
| 8,839,417 | B1 | 9/2014 | Jordan |
| 8,850,579 | B1 | 9/2014 | Kalinichenko |
| 8,869,268 | B1 | 10/2014 | Barger |
| 2002/0129140 | A1 | 9/2002 | Peled et al. |
| 2003/0097439 | A1 | 5/2003 | Strayer et al. |
| 2005/0018618 | A1 | 1/2005 | Mualem et al. |
| 2005/0041590 | A1 | 2/2005 | Olakangil et al. |
| 2005/0108377 | A1 | 5/2005 | Lee et al. |
| 2006/0004748 | A1* | 1/2006 | Ramarathnam ..... G06F 16/9535 |
| 2006/0026680 | A1 | 2/2006 | Zakas |
| 2007/0180509 | A1 | 8/2007 | Swartz et al. |
| 2007/0186284 | A1 | 8/2007 | McConnell |
| 2007/0192863 | A1 | 8/2007 | Kapoor et al. |
| 2007/0294768 | A1 | 12/2007 | Moskovitch et al. |
| 2008/0014873 | A1 | 1/2008 | Krayer et al. |
| 2008/0028463 | A1 | 1/2008 | Dagon et al. |
| 2008/0141376 | A1 | 6/2008 | Clausen et al. |
| 2008/0184371 | A1 | 7/2008 | Moskovitch et al. |
| 2008/0196104 | A1 | 8/2008 | Tuvell et al. |
| 2008/0261192 | A1 | 10/2008 | Huang et al. |
| 2008/0285464 | A1 | 11/2008 | Katzir |
| 2009/0012861 | A1* | 1/2009 | Krishnaswamy ....... G06F 21/10 705/14.64 |
| 2009/0106842 | A1 | 4/2009 | Durie |
| 2009/0124241 | A1* | 5/2009 | Krishnaswamy ....... H04L 51/12 455/414.2 |
| 2009/0150999 | A1 | 6/2009 | Dewey et al. |
| 2009/0158430 | A1 | 6/2009 | Borders |
| 2009/0216760 | A1 | 8/2009 | Bennett |
| 2009/0249484 | A1 | 10/2009 | Howard et al. |
| 2009/0282476 | A1 | 11/2009 | Nachenberg et al. |
| 2010/0002612 | A1 | 1/2010 | Hsu et al. |
| 2010/0037314 | A1 | 2/2010 | Perdisci |
| 2010/0071065 | A1 | 3/2010 | Khan et al. |
| 2010/0100949 | A1 | 4/2010 | Sonwane |
| 2010/0161795 | A1 | 6/2010 | Derridder et al. |
| 2011/0099620 | A1 | 4/2011 | Stavrou et al. |
| 2011/0105213 | A1* | 5/2011 | Irwin, Jr. ................ G07F 17/32 463/17 |
| 2011/0154497 | A1 | 6/2011 | Bailey |
| 2011/0167494 | A1 | 7/2011 | Bowen et al. |
| 2011/0271341 | A1 | 11/2011 | Satish et al. |
| 2011/0302653 | A1 | 12/2011 | Frantz et al. |
| 2011/0320816 | A1 | 12/2011 | Yao et al. |
| 2012/0017281 | A1 | 1/2012 | Banerjee |
| 2012/0167221 | A1 | 6/2012 | Kang et al. |
| 2012/0174225 | A1 | 7/2012 | Shyamsunder et al. |
| 2012/0222117 | A1 | 8/2012 | Wong et al. |
| 2012/0304244 | A1 | 11/2012 | Xie et al. |
| 2012/0311708 | A1 | 12/2012 | Agarwal et al. |
| 2012/0327956 | A1 | 12/2012 | Vasudevan |
| 2013/0014253 | A1 | 1/2013 | Neou |
| 2013/0333038 | A1 | 12/2013 | Chien |
| 2014/0075557 | A1 | 3/2014 | Balabine et al. |
| 2014/0207917 | A1 | 7/2014 | Tock et al. |
| 2014/0298469 | A1 | 10/2014 | Marion et al. |
| 2015/0135265 | A1 | 5/2015 | Bagrin |
| 2015/0135326 | A1 | 5/2015 | Bailey, Jr. |
| 2016/0285978 | A1* | 9/2016 | Zlatokrilov ........... H04L 67/146 |
| 2017/0222922 | A1 | 8/2017 | Zlatokrilov |
| 2018/0007210 | A1* | 1/2018 | Todasco ............ H04M 3/53366 |
| 2018/0025076 | A1* | 1/2018 | Bastide ................... H04L 51/16 707/728 |
| 2018/0278647 | A1* | 9/2018 | Gabaev ................... G06F 21/52 |
| 2018/0316638 | A1 | 11/2018 | Yishay et al. |

OTHER PUBLICATIONS

Altshuler, Y., et al., "How Many Makes a Crowd? On the Evolution of Learning as a Factor of Community Coverage," LNCS 7227, 2012, pp. 43-52.

Altshuler, Y., et al., "Incremental Learning with Accuracy Prediction of Social and Individual Properties from Mobile-Phone Data," IEEE, 2011, 10 pages.

Altshuler, Y., et al., "Trade-Offs in Social and Behavioral Modeling in Mobile Networks," LNCS 7812, 2013, pp. 412-423.

Argamon, S., et al., "Automatically Profiling the Author of an Anonymous Text," Communication of the ACM, vol. 52, No. 2, Feb. 2009, pp. 119-123.

Argamon, S., et al., "Gender, Genre, and Writing Style in Formal Written Texts," Text & Talk, vol. 23, Issue 3, 2003, 32 pages.

Atkinson, M., et al., "Near Real Time Information Mining in Multilingual News," World Wide Web Conference, Apr. 20-24, 2009, 2 pages.

Bailey, M., et al., "Automated Classification and Analysis of Internet Malware," RAID, 2007, pp. 178-197.

Bar-Yanai, R., et al., "Realtime Classification for Encrypted Traffic," Lecture Notes in Computer Science, vol. 6049, 2010, pp. 373-385.

Barsamian, A., et al., "Identifying Network Users Using Flow-Based Behavioral Fingerprinting," FlowTraq, 2013, 23 pages.

Bayer, U., et al., "Scalable, Behavior-Based Malware Clustering," Secure Systems Lab, Technical University, Vienna, 2009, 18 pages.

Bellovin, S., "A Technique for Counting NATted Hosts," Proceedings of the 2nd ACM SIGCOMM Workshop in Internet measurement, 2002, pp. 267-272.

Bilge, Leyla, et al., "EXPOSURE: Finding Malicious Domains Using Passive DNS Analysis," Feb. 2011, 17 pages.

Bokde, D.K., et al., "Role of Matrix Factorization Model in Collaborative Filtering Algorithm: A Survey," International Journal of Advance Foundation and Research in Computer (IJAFRC), vol. 1, Issue 6, 2014, 6 pages.

Bursztein, E., "Time has something to tell us about Network Address Translation," Jul. 2007, 6 pages.

Chen, N., et al., "Mobile App Tagging," WSDM '16, San Francisco, CA, Feb. 22-25, 2016, pp. 63-72.

Chen, Y-C, et al., "OS Fingerprinting and Tethering Detection in Mobile Networks," Proceedings of the 2014 Conference on Internet Measurement, 2014, pp. 173-179.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

(56) References Cited

OTHER PUBLICATIONS

Cohen, M.I., "Source attribution for network address translated forensic captures," Digital Investigation, vol. 5, 2009, pp. 38-145.
Corney, M., et al. "Gender-Preferential Text Mining of E-mail Discourse," Proceedings of the 18the Annual Computer Security Applications Conference, 2002, 8 pages.
De Vel, O., et al., "Language and Gender Author Cohort Analysis of E-mail for Computer Forensics," Defence Science and Technology Organisation, Australia, 2002, 16 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Dietrich, C.J., et al., "CoCoSpot: Clustering and recognizing botnet command and control channels using traffic analysis," 2012, pp. 475-486.
Eagle, N., et al., "Inferring friendship network structure by using mobile phone data," PNAS, vol. 106, No. 36, 2009, pp. 15274-15278.
Eslahi, M., "botAnalytics: Improving HTTP-Based Botnet Detection by Using Network Behavior Analysis system," Dissertation, Faculty of Computer Science and Information Technology, University of Malaya, 2010, 124 pages.
Estival, D., et al., "Author Profiling for English Emails," Proceedings of the 10$^{th}$ Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Gokcen, Y., "A Preliminary Study for Identifying NAT Traffic Using Machine Learning," Thesis, Dalhousie University, Halifax, Nova Scotia, Canada, 2014, 80 pages.
Gokcen, "Can we identify, NAT behavior by analyzing Traffic Flows," IEEE Security and Privacy Workshops, 2014, pp. 132-139.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.
Gu, G., et al., "BotSniffer: Detecting Botnet Command and Control Channels in Network Traffic," Proceedings of the 15$^{th}$ Annual Network and Distributed System Security Symposium (NDSS'08), San Diego, California, 2008, 18 pages.
Huang, D-J, et al., "Clock Skew Based Client Device Identification in Cloud Environments," 26$^{th}$ IEEE International Conference on Advanced Information Networking and Applications, 2012, pp. 526-533.
Jacob, G., et al., "JACKSTRAWS: Picking Command and Control Connections from Bot Traffic," Proceedings of the 20$^{th}$ Usenix Security Symposium, San Francisco, 2011, 16 pages.
Kohno, T., "Remote Physical Device Fingerprinting," IEEE Transactions on Dependable and Secure Computing, vol. 2, No. 2, 2005, pp. 93-108.
Lakhina, A., et al., "Mining Anomalies Using Traffic Feature Distributions," SIGCOMM, 2005, pp. 217-228.
Livadas, C., et al., "Using Machine Learning Techniques to Identify Botnet Traffic," In 2$^{nd}$ IEEE LCN Workshop on Network Security (WoNS'2006), 2006, pp. 967-974.
Malmi, E., et al., "You Are What Apps You Use: Demographic Prediction Based on User's Apps," http://www.idigitaltimes.com/what-do-your-apps-say-about-you-new-app-iphone-here-tell-you-410883, 2016, 4 pages.
McHugh, J., et al., "Passive Network Forensics: Behavioural Classification of Network Hosts Based on Connection Patterns," ACM SIGOPS Operating Systems Review, vol. 42, Issue 3, 2008, pp. 99-111.
Mohrehkesh, S., et al., "Demographic Prediction of Mobile User from Phone Usage," Proceedings Mobile Data Challenge by Nokia Workshop, Newcastle, United Kingdom, 2012, 4 pages.
Mongkolluksamee, S., et al., Enhancing the Performance of Mobile Traffic Identification with Communication Patterns, Conference Paper, 2015, 11 pages.
Navarro, Gonzalo, et al., "Flexible Pattern Matching in Strings: Practical On-Line Search Algorithms for Texts and Biological Sequences," Cambridge University Press, 2002, 166 pages.
NetOptics, Inc., Product Sheet, 1996, 1 page.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S Ramon COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Rangel, F., et al., "Overview of the Author Profiling Task at PAN 2013," CLEF 2013 Evaluation Labs, 2013, 13 pages.
Rieck, K., et al., "Botzilla: Detecting the 'Phoning Home' of Malicious Software," Proceedings of the ACM Symposium on Applied Computing (SAC), Sierre, Switzerland, 2010, 7 pages.
Sandvine Inc., "Policy Control for Connected and Tethered Devices," 2015, 11 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.

(56) References Cited

OTHER PUBLICATIONS

Thonnard, O., et al., "Actionable Knowledge Discovery for Threats Intelligence Support Using a Multi-Dimensional Data Mining Methodolgy," 2008 IEEE International Conference on Data Mining Workshops, 2008, pp. 154-163.

Tongaonkar, Alok S., "Fast Pattern-Matching Techniques for Packet Filtering," Stony Brook University, May 2004, 44 pages.

Verint Systems Inc., "Mass Link Analysis: Solution Description," Dec. 2008, 16 pages.

Wang, H., et al., "NetSpy: Automatic Generation of Spyware Signatures for NIDS," Proceedings of the $22^{nd}$ Annual Computer Security Applications Conference, Miami Beach, Florida, Dec. 2006, ten pages.

Yu, Fang, et al., "Fast and Memory-Efficient Regular Expression Matching for Deep Packet Inspection," ANCS'06, San Jose, California, Dec. 3-5, 2006, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

Zhang, Y., et al., "Detecting Stepping Stones," Proceedings of the $9^{th}$ USENIX Security Symposium, Denver, Colorado, 2000, 11 pages.

\* cited by examiner

SYSTEM AND METHOD FOR TRACKING USERS OF COMPUTER APPLICATIONS

CROSS REFERENCE TO RELATED APPLICATIONS

The present application is related to an Israel application entitled "System and method for identifying relationships between users of computer applications" (Israeli Patent Application No. 252037, filed on Apr. 30, 2017, which corresponds to U.S. patent application Ser. No. 15/966,009, filed Apr. 30, 2018, pending.

FIELD OF THE DISCLOSURE

The present disclosure relates to the monitoring of communication traffic generated by users of computer applications.

BACKGROUND OF THE DISCLOSURE

Various computer applications allow users to exchange communication with each other over a communication network, such as the Internet. Such an exchange may be actively performed, as when one user uses an application to send a text message to another user. Alternatively, such an exchange may be passively performed, as when the device of a first user passes to a second user, via the application server, a status-update message that contains information relating to the status of the first user with respect to the application. For example, upon a given user launching the application, the application may send a message to some or all of the user's contacts, indicating that the user is now "online." (The user may also receive respective status-update messages from the user's contacts.) Subsequently, while the application is running, the application may periodically send the user's contacts additional status-update messages, to notify the contacts that the user remains online. As another example of a passive exchange, upon a first user opening a message from a second user, the first user's device may send a message to the second user, indicating that the message has been opened.

Many computer applications use encrypted protocols, such that the communication traffic exchanged by these applications is encrypted. Examples of such applications include Gmail, Facebook, Twitter, and Whatsapp. Examples of encrypted protocols include the Secure Sockets Layer (SSL) protocol and the Transport Layer Security (TLS) protocol.

US Patent Application Publication 2016/0285978, whose disclosure is incorporated herein by reference, describes a monitoring system that monitors traffic flows exchanged over a communication network. The system characterizes the flows in terms of their temporal traffic features, and uses this characterization to identify communication devices that participate in the same communication session. By identifying the communication devices that serve as endpoints in the same session, the system establishes correlations between the users of these communication devices. The monitoring system characterizes the flows using traffic features such as flow start time, flow end time, inter-burst time and burst size, and/or statistical properties of such features. The system typically generates compressed-form representations ("signatures") for the traffic flows based on the temporal traffic features, and finds matching flows by finding similarities between signatures.

SUMMARY OF THE DISCLOSURE

There is provided, in accordance with some embodiments of the present disclosure, a system that includes a network interface and a processor. The processor is configured to receive, via the network interface at a first time, a first message from a server that services a computer application. The processor is further configured to receive, at a second time, a second message from the server, and to posit that the first message is destined for a first user of the computer application, and the second message is destined for a second user of the computer application. In response thereto, and in response to the first time being within a given interval from the second time, the processor is configured to posit, with a particular level of confidence, a relationship, via the computer application, between the first user and the second user. The processor is further configured to generate an output that indicates the relationship, in response to the level of confidence exceeding a given threshold.

In some embodiments, the processor is configured to posit the relationship by positing that the first user and second user have, at least on one occasion, exchanged communication with one another via the computer application.

In some embodiments, the processor is further configured:
to monitor further communication exchanged with the server, subsequently to positing the relationship, and
to increase the level of confidence, based on the monitoring, such that the level of confidence exceeds the given threshold.

In some embodiments, the processor is configured to increase the level of confidence by:
receiving from the first user, at a third time, a third message, which is destined for the server,
receiving from the server, at a fourth time, a fourth message, which is destined for the second user,
identifying that the fourth time follows the third time by an interval that is within a given range, and that respective sizes of the third message and fourth message indicate that the third message and fourth message are of the same type,
in response to the identifying, positing that the fourth message corresponds to the third message, and
increasing the level of confidence responsively thereto.

In some embodiments, the processor is configured to posit the relationship between the first user and second user by:
positing, based on respective sizes of the first message and second message, that the first message and second message are related to one another, and
in response thereto, positing the relationship between the first user and second user.

In some embodiments, the processor is configured to posit that the first message and second message are related to one another by positing that the second message acknowledges receipt, by the server, of a message to which the first message corresponds.

In some embodiments,
the processor is configured to posit that the first message and second message are related to one another by positing that each of the first message and second message corresponds to a status-update message from a third user that indicates a status, with respect to the computer application, of the third user, and
the processor is configured to posit the relationship between the first user and second user by positing that the first user and second user are related to one another by virtue of both the first user and second user being related, via the computer application, to the third user.

In some embodiments, the processor is further configured to posit that a given user is the third user, in response to receiving from the server, at a third time that is within the given interval from the first time, an acknowledgement message destined for the given user.

In some embodiments, the processor is further configured to posit that a given user is the third user, in response to receiving from the server, at a third time that is within the given interval from the first time, another status-update message destined for the given user.

In some embodiments, the processor is configured to posit that the first message is destined for the first user by:

identifying that the first message is destined for a particular internet protocol (IP) address, causing another message to be sent to the first user, identifying that the other message is destined for the particular IP address, and in response thereto, positing that the first message was destined for the first user.

There is further provided, in accordance with some embodiments of the present disclosure, a method that includes receiving, at a first time, a first message from a server that services a computer application, and receiving, at a second time, a second message from the server. The method further includes, using a processor, positing that the first message is destined for a first user of the computer application, and the second message is destined for a second user of the computer application, and, in response thereto, and in response to the first time being within a given interval from the second time, positing, with a particular level of confidence, a relationship, via the computer application, between the first user and the second user. The method further includes, in response to the level of confidence exceeding a given threshold, generating an output that indicates the relationship.

There is further provided, in accordance with some embodiments of the present disclosure, a system that includes a network interface and a processor. The processor is configured to establish, with a server that services a computer application, a user profile for the computer application, and to register, with the server, a first user of the computer application as a contact, with respect to the computer application, of the established user profile. The processor is further configured to receive, subsequently, via the network interface at a first time, a status-update message from the server, and, at a second time, another message from the server, the status-update message being destined for the established user profile. The processor is further configured to identify that the status-update message indicates a status of the first user with respect to the computer application, and to posit that the other message is destined for a second user of the computer application. In response thereto, and in response to the second time being within a given interval from the first time, the processor is configured to posit, with a particular level of confidence, a relationship, via the computer application, between the first user and the second user. The processor is further configured to generate an output that indicates the relationship, in response to the level of confidence exceeding a given threshold.

In some embodiments, the processor is configured to posit the relationship by positing that the first user and second user have, at least on one occasion, exchanged communication with one another via the computer application.

In some embodiments, the processor is configured to posit the relationship by:

positing, based on a size of the other message, that the other message also indicates a status of the first user with respect to the computer application, and positing the relationship responsively thereto.

In some embodiments, the processor is configured:

to establish the user profile on a dedicated instance of the computer application having no other user profiles, and to register the first user as an only contact of the established user profile.

There is further provided, in accordance with some embodiments of the present disclosure, a method that includes, using a processor, establishing, with a server that services a computer application, a user profile for the computer application, and registering, with the server, a first user of the computer application as a contact, with respect to the computer application, of the established user profile. The method further includes, subsequently, receiving, at a first time, a status-update message from the server, and, at a second time, another message from the server, the status-update message being destined for the established user profiled. The method further includes identifying that the status-update message indicates a status of the first user with respect to the computer application, and positing that the other message is destined for a second user of the computer application, and, in response thereto, and in response to the second time being within a given interval from the first time, positing, with a particular level of confidence, a relationship, via the computer application, between the first user and the second user. The method further includes, in response to the level of confidence exceeding a given threshold, generating an output that indicates the relationship.

There is further provided, in accordance with some embodiments of the present disclosure, a system that includes a network interface and a processor. The processor is configured to establish, with a server that services a computer application, one or more user profiles for the computer application, and to register, with the server, a given user of the computer application as a contact, with respect to the computer application, of one of the established user profiles. The processor is further configured to cause, subsequently, a status-update message, indicating a status of one of the established user profiles with respect to the computer application, to be sent to the server. The processor is further configured to receive via the network interface, subsequently, at a first time, a first message from the server, and, at a second time, a second message from the server, the first message being destined for a given internet protocol (IP) address, and the second message being destined for one of the established user profiles. In response to the second time being within a given interval from the first time, the processor is configured to posit, with a particular level of confidence, that the given user is using the IP address. The processor is further configured to act on an assumption that the given user is using the IP address, in response to the level of confidence exceeding a given threshold.

In some embodiments, the processor is configured to act on the assumption that the given user is using the IP address by generating an output indicating that the given user is using the IP address.

In some embodiments, the processor is configured to act on the assumption that the given user is using the IP address by processing subsequent communication exchanged with the IP address.

In some embodiments, the processor is configured to act on the assumption that the given user is using the IP address by identifying a physical location of the IP address.

In some embodiments, the processor is configured to posit that the given user is using the IP address by:

positing, based on a size of the first message, that the first message corresponds to the status-update message, and in response thereto, positing that the given user is using the IP address.

In some embodiments, the one or more user profiles consist of a single user profile.

In some embodiments, the processor is configured to posit that the given user is using the IP address responsively to the second message acknowledging receipt, by the server, of the status-update message.

In some embodiments, the processor is configured to posit that the given user is using the IP address responsively to the second message being another status-update message indicating a status of the given user with respect to the computer application.

In some embodiments, the one or more user profiles include a first user profile and a second user profile, the processor is configured to register, with the server, (i) one of the first user profile and the second user profile as a contact, with respect to the computer application, of the other one of the first user profile and the second user profile, and (ii) the given user as a contact, with respect to the computer application, of the first user profile, the status-update message indicates a status of the first user profile and is sent by the first user profile, and the processor is configured to posit that the given user is using the IP address responsively to the second message corresponding to the status-update message and being destined for the second user profile.

In some embodiments, the processor is configured to posit that the given user is using the IP address by:

receiving, at a third time, an acknowledgement message, which acknowledges receipt of the status-update message by the server, and in response to the third time being within the given interval from the first time, positing that the given user is using the IP address.

In some embodiments, the processor is configured to posit that the given user is using the IP address by:

receiving, at a third time, another status-update message from the server, the other status-update message indicating a status, with respect to the computer application, of the given user, and being destined for the first user profile, and in response to the third time being within the given interval from the first time, positing that the given user is using the IP address.

There is further provided, in accordance with some embodiments of the present disclosure, a method that includes, using a processor, establishing, with a server that services a computer application, one or more user profiles for the computer application, and registering, with the server, a given user of the computer application as a contact, with respect to the computer application, of one of the established user profiles. The method further includes causing a status-update message, indicating a status of one of the established user profiles with respect to the computer application, to be sent to the server. The method further includes, subsequently, receiving, at a first time, a first message from the server, and, at a second time, a second message from the server, the first message being destined for a given internet protocol (IP) address, and the second message being destined for one of the established user profiles. The method further includes, in response to the second time being within a given interval from the first time, positing, with a particular level of confidence, that the given user is using the IP address, and, in response to the level of confidence exceeding a given threshold, acting on an assumption that the given user is using the IP address.

There is further provided, in accordance with some embodiments of the present disclosure, a computer software product including a tangible non-transitory computer-readable medium in which program instructions are stored. The instructions, when read by a processor, causes the processor to establish, with a server that services a computer application, one or more user profiles for the computer application. The instructions further cause the processor to register, with the server, a given user of the computer application as a contact, with respect to the computer application, of one of the established user profiles. The instructions further cause the processor to cause, subsequently, a status-update message, indicating a status of one of the established user profiles with respect to the computer application, to be sent to the server, and to receive, subsequently, at a first time, a first message from the server, and, at a second time, a second message from the server, the first message being destined for a given internet protocol (IP) address, and the second message being destined for one of the established user profiles. The instructions further cause the processor, in response to the second time being within a given interval from the first time, to posit, with a particular level of confidence, that the given user is using the IP address. The instructions further cause the processor to act on an assumption that the given user is using the IP address, in response to the level of confidence exceeding a given threshold.

The present disclosure will be more fully understood from the following detailed description of embodiments thereof, taken together with the drawings, in which:

DETAILED DESCRIPTION OF EMBODIMENTS

Overview

Figure 1:
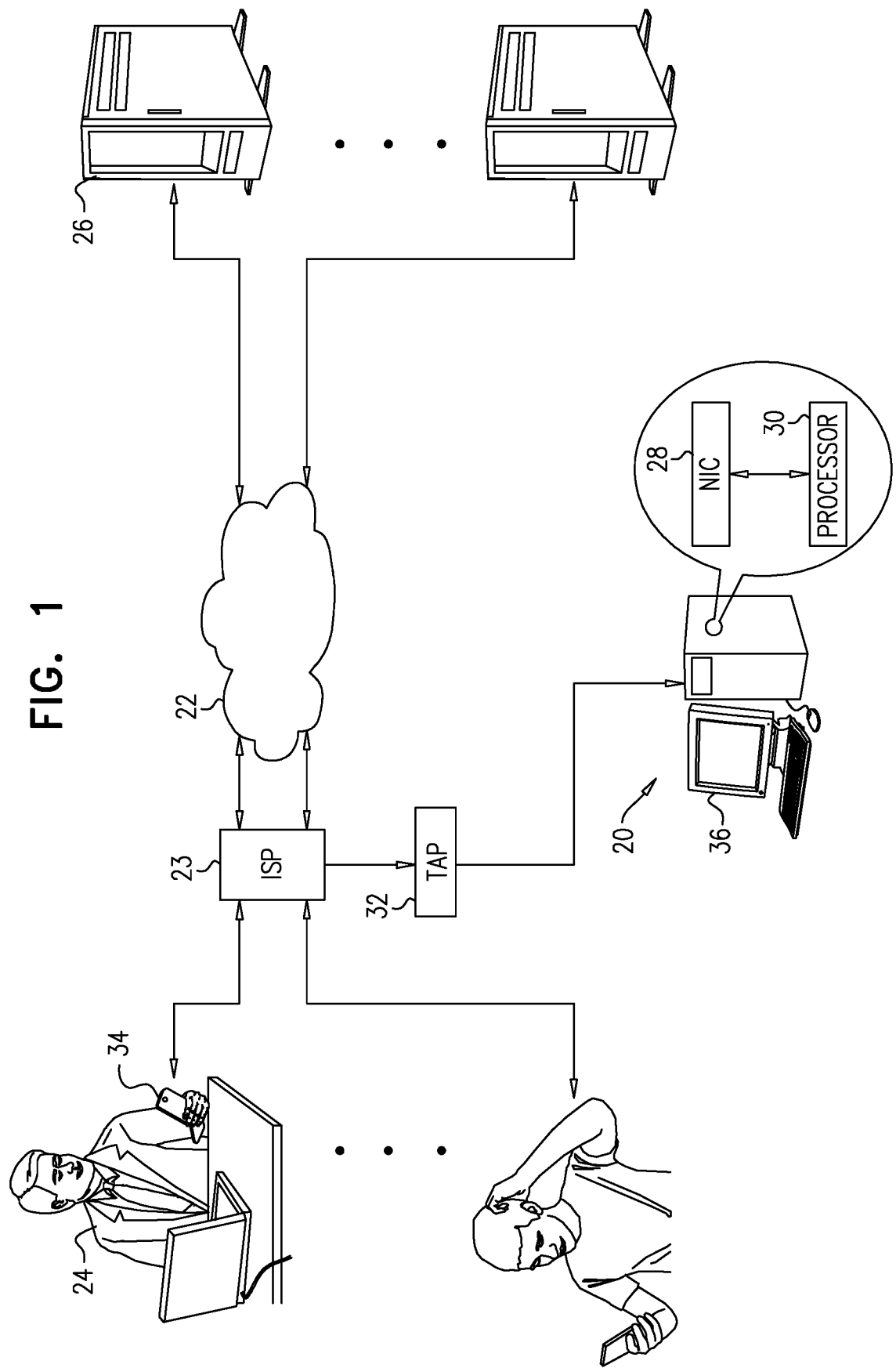
FIG. 1 is a schematic illustration of a system for monitoring communication exchanged over a network, in accordance with some embodiments of the present disclosure.

In some cases, interested parties may wish to identify relationships between users of a computer application, such as an "app" that runs on a mobile phone, by monitoring the communication traffic generated by the application. A challenge in doing so, however, is that the traffic generated by the application may be encrypted. Moreover, many applications use a server to intermediate communication between users, such that traffic does not flow directly between the users.

Embodiments of the present disclosure address this challenge, using a technique that does not require any decryption, and which requires only passive monitoring of communication exchanged with the application server. In particular, in embodiments described herein, a monitoring system receives messages that are exchanged with the application server, and relationships between users are posited in response to the times at which the messages are received. For example, a relationship between two users may be posited in response to receiving, at approximately the same time, two messages from the application server that are destined, respectively, for the two users. The near-simultaneous receipt of the two messages indicates that the two messages were sent from the server at approximately the same time, which, in turn, indicates that the two messages may correlate with one another. Further indication of a correlation between the messages, which may increase the level of confidence with which the relationship between the two users is posited, may be found by examining the respective sizes of the messages, which indicate the message types.

For example, a first user may use a particular messaging application to send a text message to a second user, via the application server. Upon receiving the text message, the server may forward the text message to the second user, and also, at approximately the same time, send an acknowledgement message to the first user. The monitoring system described herein may identify this closeness in time, and may further identify, based on the respective sizes of the messages, that the first user received an acknowledgement message, while the second user received a text message (or another type of actively-communicated message). Since this pattern of communication indicates that the first user may have sent the text message to the second user, the system may posit, with a particular level of confidence, that the two users are related to one another. (Such a level of confidence is typically quantified as a probability P, or as another quantity derived from P, such as $\log(1-P)$.)

As the system continues to identify similar pairs of correlated messages, the system may increase the system's level of confidence that the two users are related. Alternatively or additionally, to increase the system's level of confidence, the system may identify that a particular message destined for one of the users was received from the server following an expected round-trip interval from the time at which a related message, destined for the server, was received from the other one of the users. For example, while a first user is typing a text message to a second user, the user's device may periodically send a "typing" message to the second user, via the server. If the interval between (i) receipt, from the first user, of a typing message destined for the server, and (ii) receipt, from the server, of another typing message destined for the second user, is within a range of expected round-trip intervals, the system may increase the level of confidence that the two users are related.

In some cases, the system may identify that a first user and a second user are related to one another by virtue of being related to a common third user. For example, upon the third user activating or exiting from the application, the third user may send a status-update message, via the server, to both the first and second user. Hence, further to a near-simultaneous receipt of two status-update messages destined, respectively, for the first and second users, the system may hypothesize that the first and second users are related to a common third user. (As before, as similar pairs of messages continue to be observed, the system may increase the confidence level of this hypothesis.) The system may further identify the common third user, e.g., in response to receiving, at approximately the same time as receiving the two status-update messages, another potentially related message, such as an acknowledgement message, or another status-update message potentially from the first or second user, destined for the third user.

In some embodiments, the system registers a particular user of interest as a contact of a "robot" user profile, without the knowledge of the user of interest. This causes the server to send, to the user profile, status-update messages that indicate changes in the status of the user of interest. The system may then identify other users who may be related to the user of interest, in response to observing other status-update messages, destined for these users, sent by the server at approximately the same time as a status message was sent to the user profile. Advantageously, this technique may allow identifying these relationships, even if the communication exchanged between the user of interest and the server cannot be directly monitored.

Alternatively, the system may identify the IP address used by the user of interest, such as, for example, to physically track the user of interest, or to monitor further communication exchanged with the user of interest. To do this, the system may use two user profiles, one of these user profiles being a contact of the other user profile. Using the first user profile, the system may register the user of interest as a contact, such that status-update messages are sent from the first user profile, via the server, to both the user of interest and the second user profile. Hence, upon receiving, from the server, at approximately the same time, (i) a status-update message destined for a particular IP address, and (ii) another status-update message destined for the second user profile, the system may infer that the user of interest is using the particular IP address.

Alternatively, the system may use only a single user profile. Using this user profile, the system may send a status-update message to the user of interest, such that the system subsequently receives an acknowledgement message, destined for the user profile, acknowledging receipt of the status-update message by the server. If this acknowledgement message is received at approximately the same time as a status-update message en-route to a particular IP address is received, the system may identify that this IP address is being used by the user of interest. Alternatively, the system may identify the IP address in response to receiving from the server a status-update message, destined for the user profile and presumed to be from the user of interest, at approximately the same time as receiving, from the server, another message destined for the IP address. This other message may be, for example, an acknowledgement of the status-update message. Alternatively, this message may be a status-update message indicating the status of the user profile.

Alternatively, the system may use two user profiles as described above, and identify the IP address in response to a status-update message from the first user profile and destined for the IP address being received from the server at approximately the same time as (a) another status-update message from the first user profile, destined for the second user profile, was received from the server, and (b) an acknowledgement message, or a status-update message reporting the status of the user of interest, was received from the server en-route to the first user profile. (As before, the system may increase its confidence by identifying multiple instances of such near-synchronous message receipts.)

In some embodiments, the system identifies that a particular second user is tracking a first user without the first user's knowledge. First, the system registers the first user as a contact of the system's user profile. Subsequently, the system may identify that a first status-update message destined for the second user was received from the server at approximately the same time as a second status-update message, indicating the status of the first user, was received from the server en-route to the user profile. (This pattern of communication suggests that the first status-update message also indicates the status of the first user.)

The techniques described herein may be used with any suitable types of applications, including messaging applications, gaming applications, and chat room applications.

Glossary

In the context of the present application, including the claims, the term "exchange of communication" may refer to either an active or passive exchange. A given exchange of communication may be described as being performed by a user, by the user's device, by the instance of the application running on the user's device, or by a server that services the application.

In the context of the present application, including the claims, two users who have, at least on one occasion, used a given application to exchange (e.g., via the application server) communication with one another or with a common third user, are said to be related to one another via the application, even if neither one of the users is registered with the application server as a contact of the other user. A relationship between two users may be said to exist even if one of the users has not consented to the relationship. For example, two users may be related to one another if one of the users, without the other user's knowledge, receives status-update messages from the other user.

In the context of the present application, including the claims, a "round-trip interval" refers to the total interval (in units of time) required for a message to travel from a particular node on a communication network to the server, and for another message, sent immediately by the server responsively to the first message, to then travel from the server back to the node, or to another node in a similar location within the network. (This term is generally analogous to the term "round-trip time," which is commonly used in the art.)

In the context of the present application, including the claims, a second message is said to "correspond" to a first message if the second message conveys any essential information that is conveyed by the first message, and is sent by the server to the intended recipient of the first message responsively to receiving the first message. For example, a text message is passed from one user to another user in two stages. First, the sender sends a first message, conveying the text, to the server. Next, the server sends a second message, also conveying the text, to the recipient. This second message is said to correspond to the first message. It is noted that the respective sizes of two corresponding messages need not necessarily be the same. Rather, the upstream message, passed by the sender to the server, may have a first expected size (or a first range of expected sizes), and the corresponding downstream message, passed by the server to the recipient, may have a second expected size (or a second range of expected sizes) that is different from the first. (These expected sizes, or ranges of expected sizes, may vary as a function of various factors, such as the type of message, the type and version of the operating system, and the version of the application.)

In the context of the present application, including the claims, the term "acknowledgement message" may refer to any message that is sent upon receipt of another message such that the former message explicitly or implicitly acknowledges receipt of the latter message. As an example of an implicit acknowledgement, upon receiving a status-update message from a user, the server may send, to the user, another status-update message indicating the status of one or more of the user's contacts.

In general, the present application, including the claims, tends to use the word "posit" when the associated level of confidence of the relevant postulate is relatively low, and "identify" or "ascertain" when this level of confidence is relatively high. However, it is noted that the terms "posit," "identify," and "ascertain" may be used, in some cases, interchangeably.

System Description

Reference is initially made to FIG. 1, which is a schematic illustration of a system 20 for monitoring communication exchanged over a network 22, such as the Internet, in accordance with some embodiments of the present disclosure.

FIG. 1 depicts a plurality of users 24 using computer applications, which may run on personal computers or mobile devices 34, to communicate with each other over network 22. An example of an application that may be used exchanged communication over network 22 is the Whatsapp application, which allows users to exchange voice communication, text messages, images, and other forms of communication. A plurality of servers 26 service the computer applications, such that communication between users 24 is exchanged via servers 26. (A given server may service more than one application.)

In many cases, a server 26 may acknowledge the receipt of a message from a user, by sending an acknowledgement message to the user. (Such a message may alternatively be described as being sent to the user's device, or to the instance of the application running on the user's device, given that the user does not necessarily see the message.) Typically, the server sends such an acknowledgement message at approximately the same time as the message from the user (or, more specifically, a message that "corresponds" to the message from the user, as explained immediately below) is passed to its intended destination.

Typically, system 20 passively monitors the communication over network 22, in that the system does not intermediate the exchange of communication traffic between users 24 and servers 26, but rather, receives copies of the traffic from one or more network taps 32. Although network taps 32 may be situated at any suitable point in the network, the network taps are typically situated as close as possible to servers 26, to minimize the variation in delay between the sending of a downlink packet by a server, and receipt of this packet by a network tap. (Due to this small variation, it may be assumed that two downlink messages received by the network taps at approximately the same time were sent from the server at approximately the same time.) For example, network taps 32 may be situated near one or more Internet Service Providers (ISPs) 23.

Communication traffic over network 22 is exchanged in units of packets. In some cases, a message may span more than one packet of communication, or a single packet may contain more than one message. System 20 therefore splits or combines any received packets, as necessary, such as to yield one or more messages, before processing the messages as described herein. (The time that a given message was received by a network tap is typically considered to be the time at which the first or last packet containing at least part of the message was received by the network tap.)

To split or combine packets, the system may use any suitable technique. For example, the system may combine a first packet with a subsequent second packet, in response to the value contained in the "length" field of the first packet corresponding to the combined length of the first and second packets. Alternatively, for example, the system may split a given packet into two messages, in response to the value in the length field at the beginning of the message being less than the full length of the packet. (In such a case, typically, a subsequent length value, which follows the first message, indicates the length of the second message contained in the packet.)

Any given message received by system 20 does not typically indicate (in an unencrypted form) the identity of the sender, or the identity of the entity for whom the message is destined. Rather, the message typically specifies only the communication protocol per which the message is constructed (which is typically the TCP protocol), a source IP address and port, and a destination IP address and port. For downlink messages, the source IP address and port belong to the server, and the destination IP address and port belong to the user for whom the message is destined; for uplink messages, the source IP address and port belong to the sending user, and the destination IP address and port belong to the server.

Hence, system 20 identifies the server with which a particular message is exchanged (and hence, the application that generated the message), by recognizing that the source or destination IP address contained in the message belongs to the server. The system further uses any suitable technique to identify the user who sent or received the message. For example, the system may refer to a cellular service provider for a mapping between IP addresses and mobile phone numbers, such that the source or destination IP address may be used to identify the user who sent or received the message. (Such a mapping may be derived, for example, from General Packet Radio Service Tunneling Protocol (GTP) data.) In the event that a user is using a network address translator (NAT), which allows multiple devices to use a single IP address, techniques for discovering the identity of a device behind a NAT, such as any of the techniques described in U.S. patent application Ser. No. 15/416,153, whose disclosure is incorporated herein by reference, may be applied. For example, the system may use one or more device identifiers, such as one or more Internet cookies, to identify the device. If, after using any of these techniques, the system suspects, but is unsure, that a particular user is the sender or recipient of a message, the system may use a "robot user" to confirm or refute the suspicion, as described below with reference to FIG. 3.

In the event that the traffic received by system 20 is encrypted, the system may identify the type of each received message based on the size of the message. For example, for each application of interest, and, optionally, for each set of conditions under which the application is run, the system may maintain a listing of expected message sizes (and/or ranges of expected message sizes) for various types of messages exchanged by the application. Upon receiving a particular message, the system may compare the size of the message to each of the expected sizes (and/or ranges of expected sizes) in this list. If the size of the message is within a given offset of one of these expected sizes (or is within one of the ranges of expected sizes), the processor may ascertain that the message is of the type corresponding to this expected size (or to this range of expected sizes). Otherwise, the processor may ascertain that the message is of another type—such as the text-message or image-file type—that does not have a typical size.

Alternatively or additionally, the system may identify the type of message based on the status, with respect to the application, of the receiving user. For example, in some applications, status-update messages are sent only to users who are presently online with respect to the application. Hence, if the system knows that a particular user is not online, the system may infer that a particular message destined for the user is not a status-update message, but rather, is of a different type. (The system may know the status of the user, for example, based on observing previous communication exchanged with the user, or the lack thereof.)

(It is noted that the size of a message is not necessarily a strong indicator of the type of the message, since, for example, (i) a message size may be within the given offset of several expected message sizes for different message types, and (ii) the size of a message that does not have a typical size (such as a text message) might coincidentally happen to be within the given offset of the expected size of another type of message. Similarly, the status of the receiving user may likewise not be a strong indicator of the type of the message. Hence, in this context, as throughout the present application, the words "ascertain" and "identify" do not necessarily imply a high level of confidence. For example, a statement such "the system identifies that an acknowledgement message was received" may mean that the system posits, with a particular level of confidence, that a particular received message is an acknowledgement message, based, for example, on this message having a size that is sufficiently close to the processor's expected acknowledgement message size.)

Figure 2:
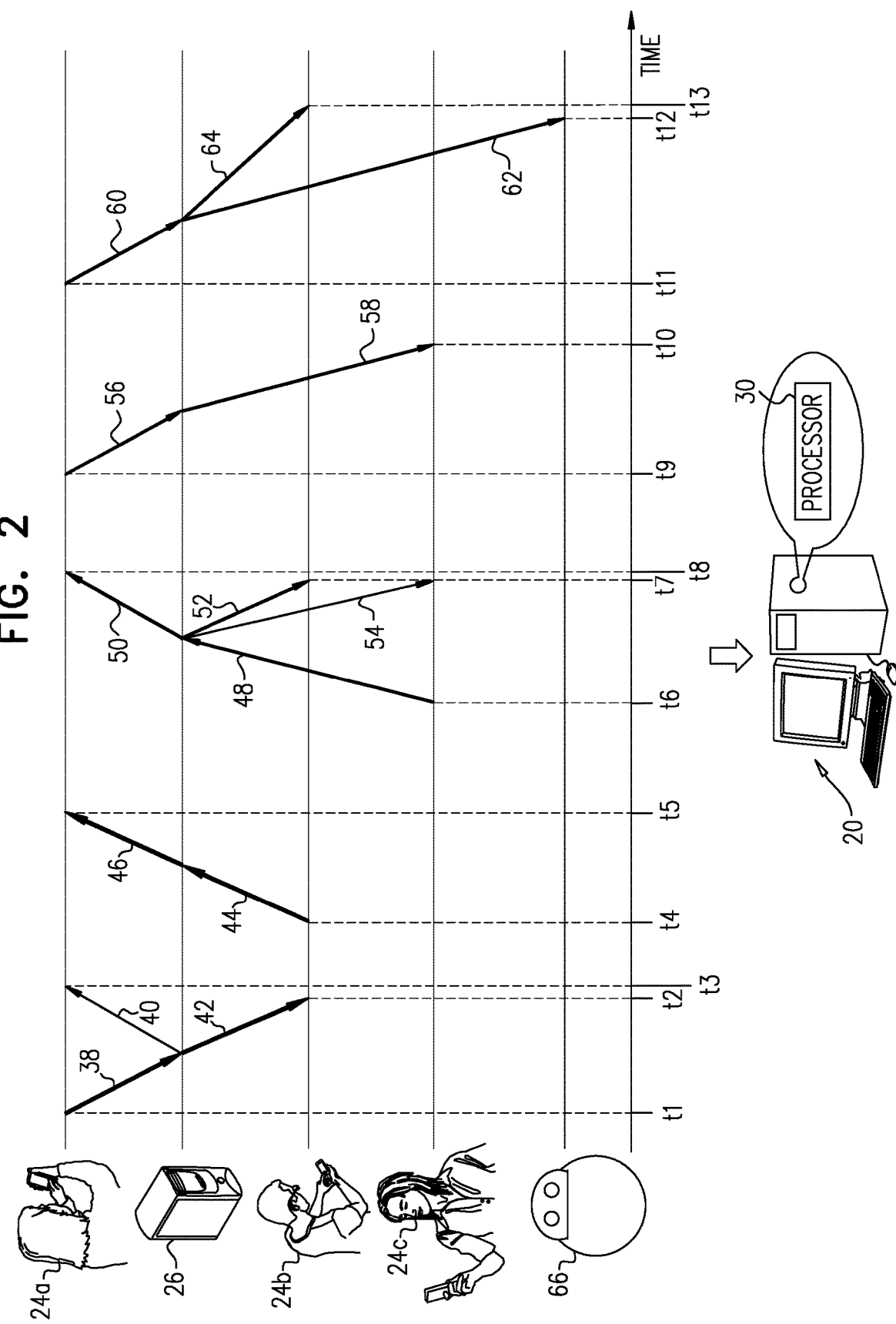
FIG. 2 is a schematic illustration of exchanges of communication from which relationships between users may be inferred, in accordance with some embodiments of the present disclosure.

One function of system 20, described in detail below with reference to FIG. 2, is to identify relationships between users, based on observing communication exchanged with the users. In this regard, it is noted that system 20 typically does not identify a relationship with absolute certainty. Rather, the system posits the relationship with a particular level of confidence that may be a function of various factors, including the number of observations that imply the relationship, and the likelihood of the relationship implied by each of these observations. Typically, the system initially posits a relationship with a low level of confidence, and then increases the level of confidence over time, based on further monitoring of the communication over network 22. Finally, if the level of confidence exceeds a given threshold, the processor may consider the relationship to be verified, and may therefore generate an output that indicates the relationship.

System 20 comprises a network interface 28, such as a network interface controller (NIC), and a processor 30. Intercepted messages from network taps 32 are received by processor 30 via network interface 28. Processor 30 processes the messages as described herein, such as to identify relationships between users 24, or perform any other functions described herein. Further to processing the messages, the processor may generate any suitable output, such as a visual output displayed on a display 36. System 20 may further comprise any suitable input devices, such as a keyboard and/or mouse, to facilitate human interaction with the system.

In general, processor 30 may be embodied as a single processor, or as a cooperatively networked or clustered set of processors. Processor 30 may be implemented using hardware, e.g., using one or more Application-Specific Integrated Circuits (ASICs) or Field-Programmable Gate Arrays (FPGAs). Alternatively, the processor may be implemented using software, or using a combination of hardware and software elements. For example, processor 30 may be a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the processor in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Identifying Relationships Between Users

Reference is now made to FIG. 2, which is a schematic illustration of exchanges of communication from which relationships between users may be inferred, in accordance with some embodiments of the present disclosure.

FIG. 2 shows three users: a first user 24a, a second user 24b, and a third user 24c. Each of these users is assumed to be using the same computer application, such as the Whatsapp application, which is serviced by a server 26. Each exchanged message is indicated by an arrow passing from the source of the message to the destination of the message. In the particular example shown, there are three types of exchanged messages, each type being represented by an arrow of a different respective thickness. In particular, (i) an arrow of greatest thickness represents an actively-communicated message, containing, for example, text, an image, or other content, (ii) an arrow of intermediate thickness represents a passively-communicated status-update message, and (iii) an arrow of smallest thickness represents an acknowledgement message from the server. (It is noted that the relative thicknesses of the arrows do not necessarily correspond to the relative sizes of the messages; for example, in some cases, an acknowledgement message may be larger than a status-update message.)

Notwithstanding the particular example in FIG. 2, it is noted that the techniques described herein may also be applied more generally, regardless of the specific types of messages that are passed through network 22. For example, system 20 may identify a relationship between two users upon observing related messages received by the users at approximately the same time, regardless of the respective types of these messages.

For simplicity, FIG. 2 (along with FIG. 3) marks the times at which messages are received by network taps 32 as if these are the times at which the messages are sent or received by the communicating endpoints. Thus, for example, although FIG. 2 depicts a message 38 sent by user 24a at a time t1, time t1 is actually the time at which message 38 was received by a network tap en-route to the server. (Processor 30 typically does not know the actual time at which message 38 was transmitted by the device of user 24a.) Similarly, although FIG. 2 depicts user 24b receiving a corresponding message 42 at a time t2, time t2 is actually the time at which message 42 was received by a network tap en-route to user 24b. (It is noted that the time at which a given message is received by a network tap is approximately equal to the time at which the message is received by system 20, such that the times indicated in FIG. 2 may be alternatively referred to as the times at which the system, or the processor, receives the messages.)

In the first exchange of communication shown in FIG. 2, as alluded to immediately above, user 24a passes a message 38, such as a text message, to user 24b, via server 26. As described earlier, such an exchange includes two steps, whereby the server first receives message 38 from user 24a, and then passes corresponding message 42 to user 24b, while also sending an acknowledgement message 40 to user 24a. Corresponding message 42 is received en-route to user 24b at a time t2, while acknowledgement message 40 is received en-route to user 24a at a time t3.

Upon observing this exchange of communication, processor 30 compares the interval between time t2 and time t3 (i.e., |t3−t2|, where the |*| operator indicates absolute value) to a threshold interval having any suitable value, such as, for example, a value that is between 2 and 4 ms. If this interval is less than the threshold interval—i.e., if messages 40 and 42 were received within the threshold interval of one another—the processor may posit that users 24a and 24b are related to one another via the application.

Typically, the processor chooses the threshold responsively to the computer application in use, the location(s) within the network of the network tap(s) that received messages 40 and 42, and/or any other relevant parameters. In some embodiments, the processor first learns a function that maps the aforementioned parameters to suitable threshold values, and subsequently uses the learned function to compute a suitable threshold for any scenario. To learn the function, the processor may monitor traffic exchanged between pairs of users who are posited by the processor, with a high level of confidence, to be related to one another.

Typically, before positing a relationship between two users based on the near-simultaneous receipt of two messages destined for these users, the processor first posits that the two messages are related to one another. In other words, to help prevent positing a relationship between users based on a coincidental near-simultaneous receipt of unrelated messages, the processor first checks if there is at least some possibility that the messages are related to one another. For example, given the above-described exchange, the processor may first ascertain, given the respective sizes of messages 42 and 40, that message 42 is a text message (or another type of actively-communicated message), and message 40 is an acknowledgement message. The processor may then posit that these messages are related to one another, in that message 40 acknowledges receipt, by the server, of message 38, to which message 42 corresponds. In response to this possible relationship between the messages, the processor may posit a relationship between users 24a and 24b.

Typically, as described above, a relationship between users is initially posited with only a low level of confidence. However, as the processor continues to gather more suggestive observations, this level of confidence may continue to grow. For example, the processor may increase its level of confidence, based on observing other instances in which the users received respective messages at approximately the same time. Alternatively or additionally, the following observations may help increase the level of confidence with which the relationship between users 24a and 24b is posited:

(i) The processor may identify that the interval between time t2 and time t1 is within a given range of expected round-trip intervals. (Equivalently, it may be said that time t2 is separated from time t1 by an expected round-trip interval.) The processor may further identify that the respective sizes of messages 38 and 42 indicate that these two messages are of the same type. This observation suggests that message 42 may correspond to message 38.

(ii) The processor may identify that, in a subsequent exchange of communication, which appears as the second exchange of communication in FIG. 2, (a) user 24*b* sent a message 44, which was received en-route to the server at a time t4, and (b) a message 46 was received en-route to user 24*a* at a time t5 that is separated from time t4 by an expected round-trip interval. The processor may further identify that the respective sizes of messages 44 and 46 indicate that these two messages are of the same type. (Such a subsequent exchange could alternatively occur in the reverse direction, i.e., user 24*a* could send a message to user 24*b*.)

Since the range of expected round-trip intervals may be relatively large, an exchange of communication such as the second exchange in FIG. 2 is typically not used to initially posit a relationship between users. Rather, an exchange such as the first exchange in FIG. 2 (transpiring between times t1 and t3), which includes a near-simultaneous receipt of related messages, is used to initially posit a relationship. Afterwards, observations based on round-trip intervals are used to increase the level of confidence with which this relationship is posited.

Another type of observation, which may be used to initially posit a relationship between users 24*a* or 24*b*, or to increase the level of confidence with which such a relationship is posited, is exhibited by the third exchange of communication in FIG. 2. In this exchange, user 24*c* sends a status-update message 48 to the server, and the server, in response, sends corresponding status-update messages 50 and 52 to users 24*a* and 24*b*, these messages being received by the system, respectively, at times t8 and t7. The processor, upon observing that times t7 and t8 are within a given threshold of one another, may posit that users 24*a* and 24*b* are related to one another by virtue being related, via the computer application, to another user. The processor may then posit that user 24*c* is this other user, using, for example, one or more of the following techniques:

(i) The processor may identify that status-update message 48 was received from user 24*c* at a time t6, and may further identify that times t7 and t8 are separated from time t6 by an expected round-trip interval.

(ii) The processor may observe that an acknowledgement message 54 destined for user 24*c* was received from the server at a time that is within a given interval from time t7 and/or time t8. (For simplicity, FIG. 2 shows message 54 received exactly at time t7.) Based on this observation, the processor may posit that message 54 acknowledges receipt of the status-update message to which messages 50 and 52 correspond, and hence, that users 24*a* and 24*b* are each related to user 24*c*.

(iii) In some cases, when a user begins to run an application, the application may send a status-update message from the user to the server. Upon receiving the status-update message, the server may send a corresponding status-update message to each of the user's contacts (or to each of a subset thereof, such as the subset consisting of those contacts with whom the user communicated, or whose status the user checked, during a given previous period of time), and also send, to the user, a respective status-update message for each of the user's contacts (or for each of a subset thereof), such that the "exchanged" status-update messages will be received at approximately the same time. Hence, if the system receives a status-update message destined for user 24*c* at a time that is within a given interval from time t7 and/or time t8, the processor may posit that this status-update message indicates the status of user 24*a* or user 24*b*, and hence, that users 24*a* and 24*b* are each related to user 24*c*.

The processor may increase the confidence with which user 24*c* is identified as the common "relative" of users 24*a* and 24*b*, by identifying other communication that appears to be exchanged between user 24*a* and user 24*c*, or between user 24*b* and user 24*c*. For example, as exhibited by the fourth exchange shown in FIG. 2, the processor may observe that, at a time t9, a status-update message 56 destined for the server was received from user 24*a*, and, at a time t10 that is separated from time t9 by an expected round-trip interval, a status-update message 58 destined for user 24*c* was received from the server. This observation indicates that status-update message 58 may indicate the status of user 24*a*, such that users 24*a* and 24*c* are related to one another. (Alternatively, the processor may observe a status-update message sent from user 24*b* to user 24*c*, or from user 24*c* to user 24*a* or user 24*b*.)

In general, the level of confidence with which a relationship (between messages, or between users) is posited may depend on various factors. One such factor is the total number of users for whom were destined similar types of messages received by the system at approximately the same time as the system received the message(s) in question. For example, referring again to the first exchange of communication in FIG. 2, the processor may posit that acknowledgement message 40 is related to actively-communicated message 42 (and hence, that user 24*a* is related to user 24*b*) with only a relatively low level of confidence, if many other actively-communicated messages and/or acknowledgement messages were received by the system near times t2 and t3. Conversely, the level of confidence may be relatively large, if only a few other messages of these types were received near times t2 and t3. Similarly, the degree to which this level of confidence is increased responsively to the second exchange of communication in FIG. 2 may depend on the number of other users from whom the system received messages, and especially messages whose size indicates a possible correspondence to message 46, near time t4.

In some embodiments, the processor establishes, with server 26, a user profile 66 for the application. User profile 66, which may be alternatively referred to as a "robot user," may help the processor initially posit a relationship between users, and/or increase the confidence with which such a relationship is posited. (It is noted that any actions recited or described herein as being performed by user profile 66, or by any other user profile established by the processor, may be attributed to the processor itself, since the processor controls any user profiles that it establishes.)

For example, assuming that user 24*a* is a "user of interest," such that the processor attempts to discover any users who are related to user 24*a*, the processor may first register, with the server, user 24*a* as a contact, with respect to the application, of user profile 66. Subsequently, by monitoring communication exchanged with the server, the processor may identify that a status-update message 62, indicating the status of user 24*a* with respect to the application and destined for user profile 66, was received from the server at a time t12 that is within a given interval from a time t13 at which another status-update message 64, destined for user 24*b*, was received from the server. (As described above, the processor may identify that message 64 is a status-update message, based on the size of the message.) In response thereto, the processor may posit that messages 62 and 64 correspond to a common status-update message 60 from user 24*a* (received en-route to the server at a time t11), and hence, that user 24*a* is related to user 24*b*.

It is noted that, depending on the computer application in use, the registration of user 24*a*—and hence the discovery of users who are related to user 24*a*—may be performed with or without the consent of user 24*a*. User 24*a* may consent to the registration, for example, in the event that user 24*a* suspects that a malicious user has registered user 24*a* as a contact, and is hence receiving status-update messages from user 24*a* without the consent of user 24*a*.

Typically, user profile 66 remains continuously active from the time of instantiation, such that, at least for some applications, user profile 66 does not send any status-update messages after user profile 66 is established. Moreover, even if user profile 66 sends a status-update message to user 24*a*, this message typically won't be shown on the screen of user 24*a*, unless user profile 66 is registered as a contact of user 24*a*, and user 24*a* happens to have user profile 66 on-screen at the time the message is received. (In many applications and runtime environments, the receipt of a status-update message is not indicated on-screen, unless the screen happens to already be showing the profile of the user from whom the status-update message was received.) Hence, user 24*a* will typically be unaware of user profile 66, unless user 24*a* initially agreed to be monitored.

In some embodiments, user profile 66 is established on a dedicated instance of the computer application having no other user profiles, and the user of interest is registered as the only contact of the established user profile. This facilitates identifying messages that pertain to the user of interest; for example, any status-update messages destined for user profile 66 may be assumed to pertain to the user of interest, since user profile 66 is not expected to receive status-update messages from any other user profile.

Alternatively, other techniques may be used to identify that a particular status-update message pertains to the user of interest. For example, the processor may run the application within an environment, such as a web browser, that provides, for each received status-update message, a visual indication of the user from whom the message was received. By identifying this visual indication, the processor may ascertain that the status-update message indicates the status of the user of interest. Alternatively, for example, the processor may use an open version of the application, which provides a log that indicates the user to which each status-update message pertains. In general, using these techniques may allow user profile 66 to have several contacts, such that several users of interest may be processed in parallel.

In some embodiments, yet another technique may be used to process several users of interest in parallel. Per this technique, the system registers several user profiles, in addition to user profile 66, with the server. Each user of interest is then registered as a contact of a unique subset of these user profiles, such that the subset of user profiles receiving a particular status-update message indicates the user of interest to which the message pertains.

Advantageously, using user profile 66 as described above may allow identifying users who are related to the user of interest, even if communication exchanged between the user of interest and the server cannot be directly monitored, such as in the event that the user of interest is outside of the area in which system 20 is deployed.

Tracking a User of Interest

Figure 3:
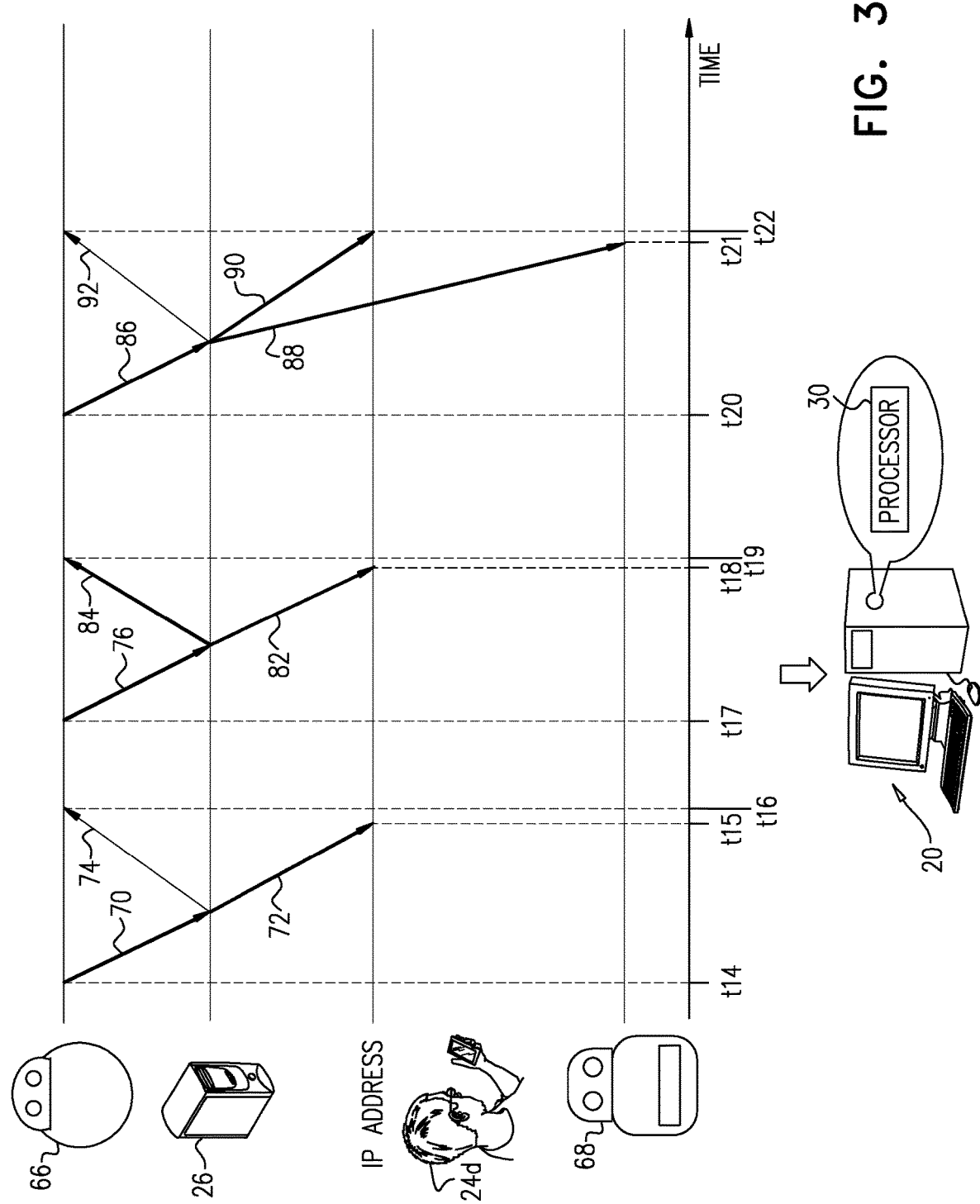
FIG. 3 is a schematic illustration of exchanges of communication from which an IP address that is being used by a user of interest may be identified, in accordance with some embodiments of the present disclosure.

Reference is now made to FIG. 3, which is a schematic illustration of exchanges of communication from which an IP address that is being used by a user of interest 24*d* may be identified, in accordance with some embodiments of the present disclosure.

FIG. 3 illustrates various techniques for discovering the IP address that is being used by user of interest 24*d*, such that subsequent communication exchanged with the user of interest may be monitored, and/or the user of interest may be physically tracked. Using the techniques of FIG. 3, the processor initially posits, with a certain level of confidence, that the user of interest is using a particular IP address. As the processor continues to monitor the communication over network 22 and thus collects further corroborating evidence, the processor may increase the level of confidence of this postulate, until the level of confidence exceeds a given threshold.

In some of the techniques of FIG. 3, the processor establishes a single user profile 66, and uses this single user profile to discover the IP address being used by the user of interest. In other techniques, the processor establishes a second user profile 68 in addition to a first user profile 66, and uses the two user profiles together. In any case, the user of interest is registered as a contact of user profile 66, as described above with reference to FIG. 2.

Each of the sections below explains a respective one of the techniques illustrated in FIG. 3.

(i) As depicted in the first exchange of communication shown in FIG. 3, the processor may, e.g., by activating the application, cause a status-update message 70 to be sent from user profile 66, this message being received, en-route to the server, at a time t14. Subsequently, the processor may identify that another status-update message 72, destined for a particular IP address, was received from the server at a time t15 that is within a given interval from a time t16 at which an acknowledgement message 74, destined for user profile 66, was received from the server. In response thereto, the processor may posit that the user of interest is using the particular IP address. (As noted above, typically, the user of interest does not notice any status-update messages from user profile 66, since user profile 66 is typically not registered as a contact of the user of interest.)

(ii) As noted above, in some cases, two users may "exchange" status-update messages with one another. The second exchange of communication shown in FIG. 3 illustrates such a case, whereby, upon receiving a status-update message 76 from user profile 66, server 26 sends a corresponding status-update message 82 to user of interest 24*d*, and also, roughly simultaneously, sends a status-update message 84, indicating a status of the user of interest, to user profile 66. The system receives message 76 at a time t17, message 82 at a time t18, and message 84 at a time t19. In such a case, the processor may identify that time t19 is within a given interval from time 18, and hence, the processor may posit that the user of interest is using the particular IP address for which status-update message 82 is destined.

(iii) In some embodiments, the processor registers, with the server, first user profile 66 as a contact, with respect to the application, of second user profile 68, or vice versa, such that second user profile 68 receives status-update messages from first user profile 66. Thus, as illustrated in the third exchange of communication shown in FIG. 3, the processor may identify that, further to a status-update message 86 being sent by the first user profile (and received by a network tap at a time t20), another status-update message 88 destined for the second user profile was received at a time t21, and yet another status-update message 90 destined for the particular IP address was received at a time t22. In response to time t22 being within a given interval from time t21, the processor may posit that messages 88 and 90 both correspond to message 86, and hence, that the user of interest is using the particular IP address.

In some embodiments, the second user profile is used on a dedicated instance of the application having no other user profiles, and the second user profile has no contacts other than, possibly, the first user profile. Due to this configuration, any status-update messages from the first user profile may be readily identified, since the second user profile is not expected to receive status-update messages from any other user profile. Alternatively, even if the second user profile has a plurality of contacts, techniques such as those described above with reference to FIG. 2, such as use of an open version of the application, may be used to identify that a particular status-update message was received from the first user profile.

(In some cases, status-update messages are not passed between two contacts unless the contacts have recently communicated with one another. Hence, the processor may generate intermittent communication between the two user profiles, to ensure that second user profile 68 receives status-update messages from first user profile 66.)

It is noted that an advantage of the second and third techniques is that they do not rely on the identification of acknowledgement messages. This may be helpful, for example, in cases in which the application does not send acknowledgement messages, or in which the size of acknowledgement messages is similar to that of other types of messages. Notwithstanding this, however, it is noted that the third technique may be combined with the first technique. In other words, to increase the level of confidence with which the processor posits that message 90 indicates the status of first user profile 66 (and hence, that the user of interest is using the particular IP address), the processor may further identify that an acknowledgement message 92 was received en-route to the first user profile within a given interval from time t22. (For simplicity, FIG. 3 shows acknowledgement message 92 received at exactly time t22.) Similarly, the processor may identify that another status-update message, indicating the status of the user of interest, was received en-route to the first user profile within a given interval from time t22.

Upon the processor's level of confidence exceeding the threshold, the processor may act on the assumption that the user of interest is using the particular IP address. For example, the processor may generate an output indicating that the user of interest is using the particular IP address. Alternatively or additionally, the processor may process any subsequent communication exchanged with this IP address under the assumption that this communication includes communication exchanged with the user of interest. For example, the processor may automatically analyze this communication to discover the user of interest's current online activities, and/or flag this communication for subsequent analysis by an expert. Alternatively or additionally, the processor may identify the physical location of the IP address, such that the user of interest may be physically tracked. For example, if the IP address is mapped to a particular WiFi identifier, the processor may lookup, e.g., in a publicly available resource, the physical location of the WiFi network having the particular WiFi identifier.

It is noted that any of the techniques described above with reference to FIG. 3 may also be used—e.g., in combination with any of the techniques described above with reference to FIG. 2—to facilitate discovering relationships between users. In this regard, it is recalled that identifying a relationship between two users, as described above with reference to FIG. 2, generally requires identifying the user who sent a particular message, or the user for whom a particular message is destined. However, as noted above, a given message received by processor 30 will generally not indicate this information, such that the processor must identify the user behind the IP address that is specified in the message. Advantageously, the techniques described with reference to FIG. 3 may be applied to this end. (The description above, with reference to FIG. 1, mentioned various other techniques that might be applied to this end. However, there may be situations in which such techniques are not applicable, or are not effective.)

For example, when attempting to identify a relationship between users, the processor may identify that a first message was destined for a particular IP address. The processor may then posit (e.g., based on any of the techniques referred to above with reference to FIG. 1, such as those described in U.S. patent application Ser. No. 15/416,153) the identity of the user for whom this message was destined. In response thereto, the processor may cause other messages to be sent to this user, by registering the user as a contact of user profile 66, such that status-update messages from user profile 66 are sent to the user. Using any of the techniques illustrated in FIG. 3, the processor may then identify that these other messages were received at the same IP address. In response thereto, the processor may identify that the first message was also received by the particular user, and hence, may identify a relationship between this user and another user.

In the embodiments described above, the system identifies a relationship between two users by identifying the near-simultaneous receipt of correlated messages of known types. In other embodiments, the system uses assumed relationships between users to facilitate learning to classify messages based on features of the messages, such as the sizes of the messages. For example, the system may hypothesize that each message in a sequence of messages received from a first user indicates that the first user is typing. The system may then receive from the server, following an expected round-trip interval, another sequence of messages destined for another user who is assumed to be related to the first user. In response thereto, the system may establish, with greater certainty, that the messages indeed indicate "typing," and, more generally, the system may learn to classify other "typing" messages, based on features of these messages.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a network interface; and
a processor, configured:
to establish, with a server for a computer application, one or more user profiles for the processor as a robot user of the computer application, to register, with the server, a given user of the computer application as a contact of the robot user, with respect to the computer application, to cause, subsequently, a status-update message, indicating a status of one of the established user profiles with respect to the computer application to be sent to the server, to receive via the network interface, subsequently, at a first time, a first message from the server, and, at a second time, a second message from the server, the first message being destined for a given internet protocol (IP) address, and the second message being destined for one of the established user profiles, in response to the second time being within a given interval from the first time, to posit, with a particular level of confidence, that the given user is using the IP address, and to act on an assumption that the given user is using the IP address, in response to the level of confidence exceeding a given threshold;

wherein the one or more user profiles include a first user profile and a second user profile, wherein the processor is configured to register, with the server, (i) one of the first user profile and the second user profile as a contact, with respect to the computer application, of the other one of the first user profile and the second user profile, and (ii) the given user as a contact, with respect to the computer application, of the first user profile, wherein the status-update message indicates a status of the first user profile and is sent by the first user profile, and wherein the processor is configured to posit the given user is using the IP address responsively to the second message corresponding to the status-update message and being destined for the second user profile.

2. The system according to claim 1, wherein the processor is configured to act on the assumption that the given user is using the IP address by generating an output indicating the given user is using the IP address.

3. The system according to claim 1, wherein the processor is configured to act on the assumption the given user is using the IP address by processing subsequent communication exchanged with the IP address.

4. The system according to claim 1, wherein the processor is configured to act on the assumption the given user is using the IP address by identifying a physical location of the IP address.

5. The system according to claim 1, wherein the processor is configured to posit the given user is using the IP address by:

positing, based on a size of the first message, the first message corresponds to the status-update message, and in response thereto, positing the given user is using the IP address.

6. The system according to claim 1, wherein the one or more user profiles consist of a single user profile.

7. The system according to claim 6, wherein the processor is configured to posit the given user is using the IP address responsively to the second message acknowledging receipt, by the server, of the status-update message.

8. The system according to claim 6, wherein the processor is configured to posit the given user is using the IP address responsively to the second message being another status-update message indicating a status of the given user with respect to the computer application.

9. The system according to claim 1, wherein the processor is configured to posit the given user is using the IP address by:

receiving, at a third time, another status-update message from the server, the other status-update message indicating a status, with respect to the computer application, of the given user, and being destined for the first user profile, and in response to the third time being within the given interval from the first time, positing the given user is using the IP address.

10. The system according to claim 1, wherein the processor is configured to posit the given user is using the IP address by:

receiving, at a third time, an acknowledgement message, which acknowledges receipt of the status-update message by the server, and in response to the third time being within the given interval from the first time, positing the given user is using the IP address.

11. A system, comprising:

a network interface; and a processor, configured:

to establish, with a server for a computer application, one or more user profiles for the computer application, to register, with the server, a given user of the computer application as a contact, with respect to the computer application, of one of the established user profiles, to cause, subsequently, a status-update message, indicating a status of one of the established user profiles with respect to the computer application, to be sent to the server, to receive via the network interface, subsequently, at a first time, a first message from the server, and, at a second time, a second message from the server, the first message being destined for a given internet protocol (IP) address, and the second message being destined for one of the established user profiles, in response to the second time being within a given interval from the first time, to posit, with a particular level of confidence, the given user is using the IP address, and to act on an assumption the given user is using the IP address, in response to the level of confidence exceeding a given threshold;

wherein the one or more user profiles include a first user profile and a second user profile, wherein the processor is configured to register, with the server, (i) one of the first user profile and the second user profile as a contact, with respect to the computer application, of the other one of the first user profile and the second user profile, and (ii) the given user as a contact, with respect to the computer application, of the first user profile, wherein the status-update message indicates a status of the first user profile and is sent by the first user profile, and wherein the processor is configured to posit the given user is using the IP address responsively to the second message corresponding to the status-update message and being destined for the second user profile wherein the processor is configured to posit the given user is using the IP address by:

receiving, at a third time, an acknowledgement message, which acknowledges receipt of the status-update message by the server, and in response to the third time being within the given interval from the first time, positing the given user is using the IP address.

12. A method, comprising:

using a processor, establishing, with a server for a computer application, one or more user profiles for the processor as a robot user of the computer application;

registering, with the server, a given user of the computer application as a contact of the robot user, with respect to the computer application;

subsequently, causing a status-update message, indicating a status of one of the established user profiles with respect to the computer application to be sent to the server;

subsequently, receiving, at a first time, a first message from the server, and, at a second time, a second message from the server, the first message being destined for a given internet protocol (IP) address, and the second message being destined for one of the established user profiles;

in response to the second time being within a given interval from the first time, positing, with a particular level of confidence, the given user is using the IP address; and in response to the level of confidence exceeding a given threshold, acting on an assumption the given user is using the IP address;

wherein the one or more user profiles include a first user profile and a second user profile, wherein the method comprises registering, with the server, (i) one of the first user profile and the second user profile as a contact, with respect to the computer application, of the other one of the first user profile and the second user profile, and (ii) the given user as a contact, with respect to the computer application, of the first user profile, wherein the status-update message indicates a status of the first user profile and is sent by the first user profile, and wherein positing the given user is using the IP address comprises positing the given user is using the IP address responsively to the second message corresponding to the status-update message and being destined for the second user profile.

13. The method according to claim 12, wherein acting on the assumption the given user is using the IP address comprises generating an output indicating the given user is using the IP address.

14. The method according to claim 12, wherein acting on the assumption the given user is using the IP address comprises processing subsequent communication exchanged with the IP address.

15. The method according to claim 12, wherein acting on the assumption the given user is using the IP address comprises identifying a physical location of the IP address.

16. The method according to claim 12, wherein positing the given user is using the IP address comprises:

positing, based on a size of the first message, the first message corresponds to the status-update message; and in response thereto, positing the given user is using the IP address.

17. The method according to claim 12, wherein the one or more user profiles consist of a single user profile.

18. The method according to claim 17, wherein positing the given user is using the IP address comprises positing the given user is using the IP address responsively to the second message acknowledging receipt, by the server, of the status-update message.

19. The method according to claim 17, wherein positing the given user is using the IP address comprises positing the given user is using the IP address responsively to the second message being another status-update message indicating a status of the given user with respect to the computer application.

* * * * *